W. SCHAU.
TIRE SETTER.
APPLICATION FILED OCT. 15, 1906.
948,637.
Patented Feb. 8, 1910.
5 SHEETS—SHEET 1.
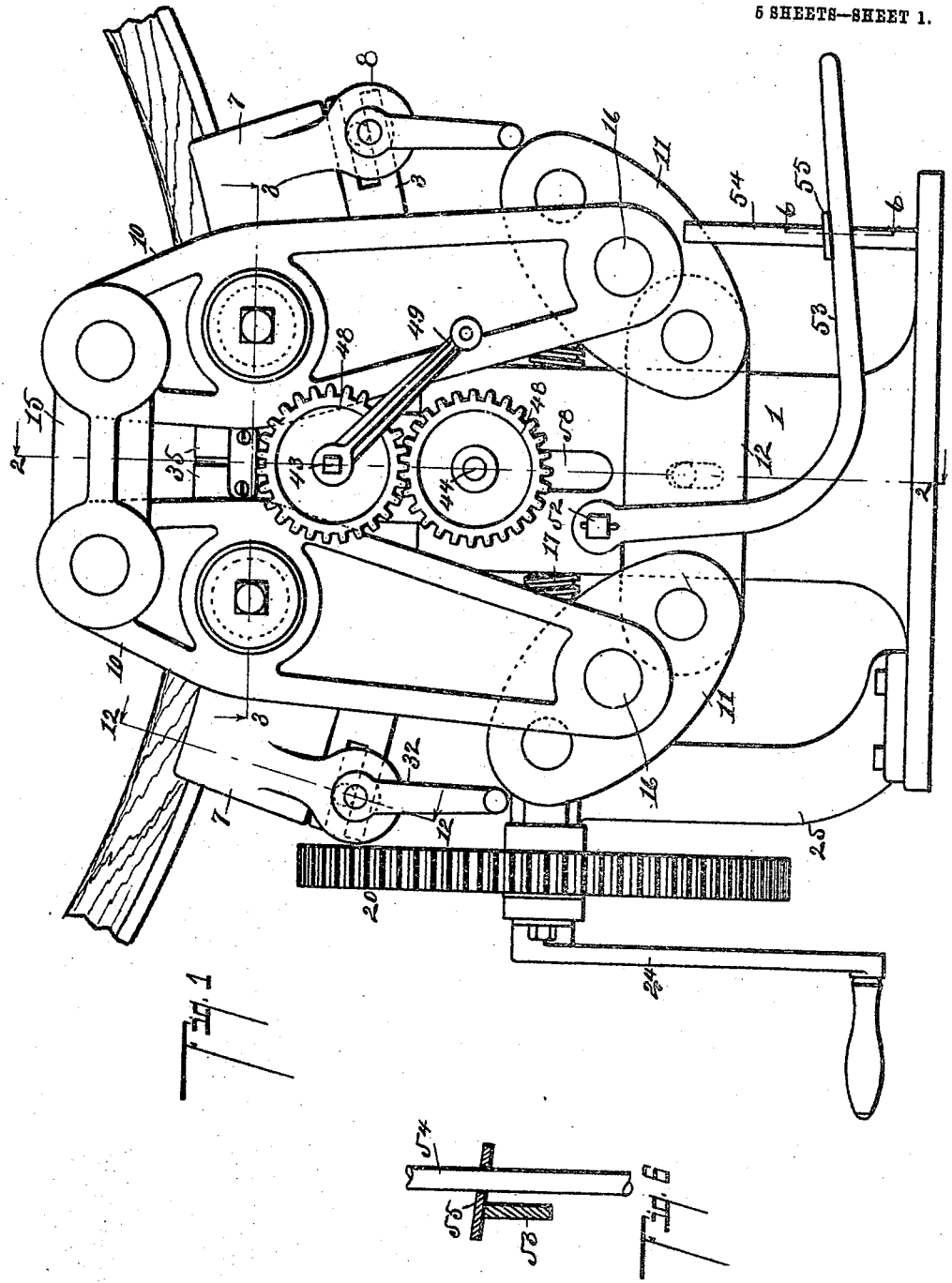

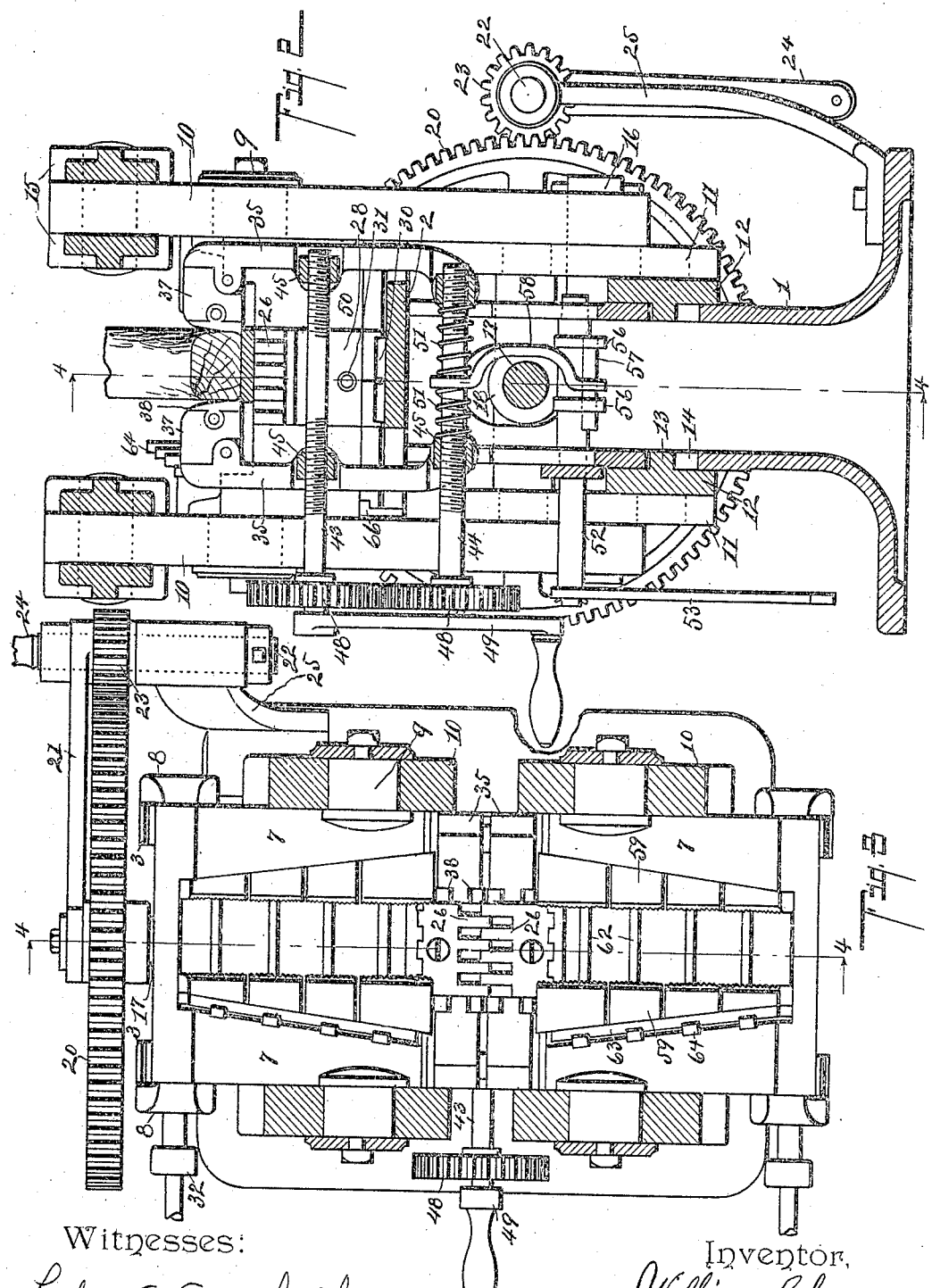

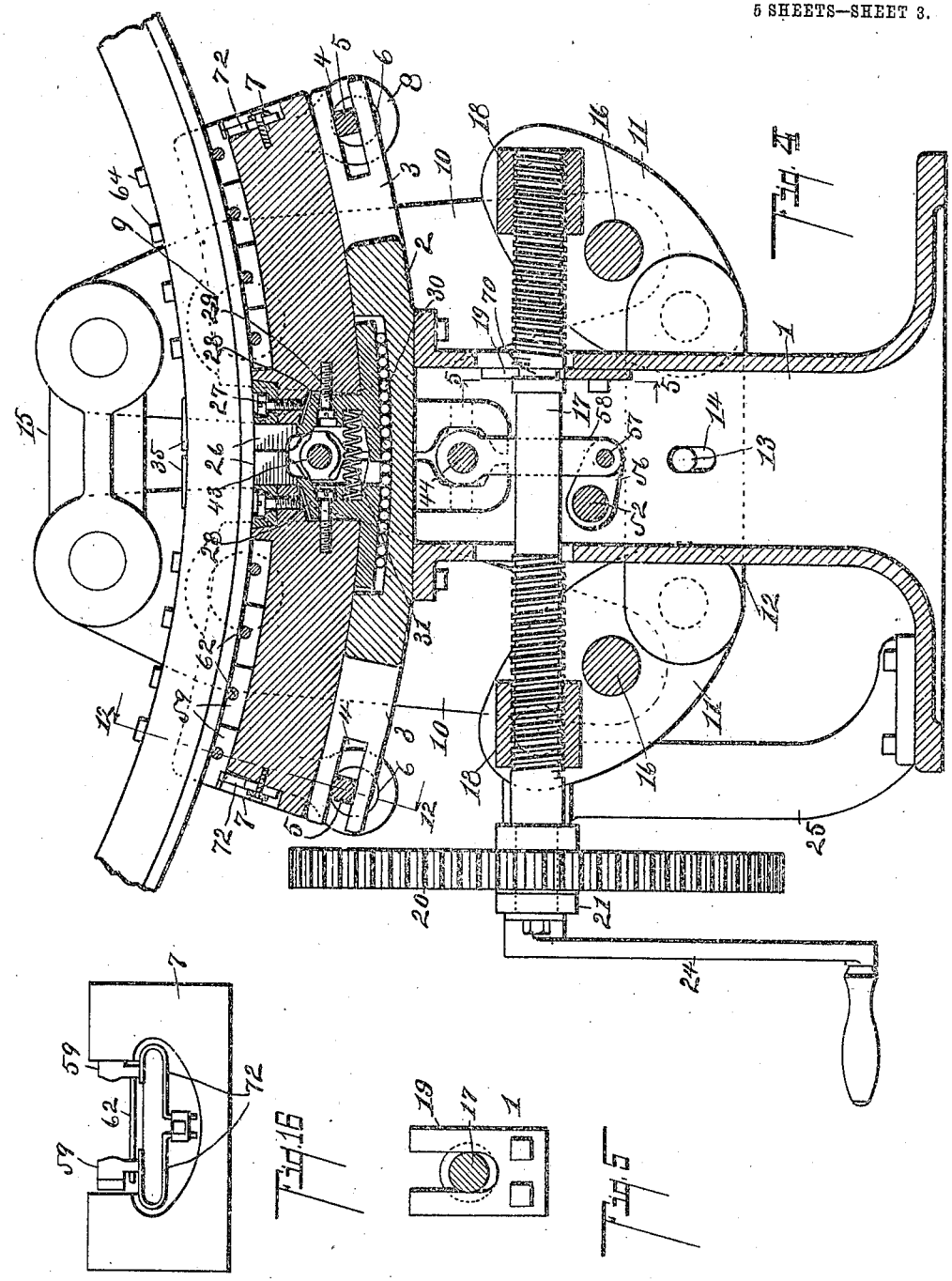

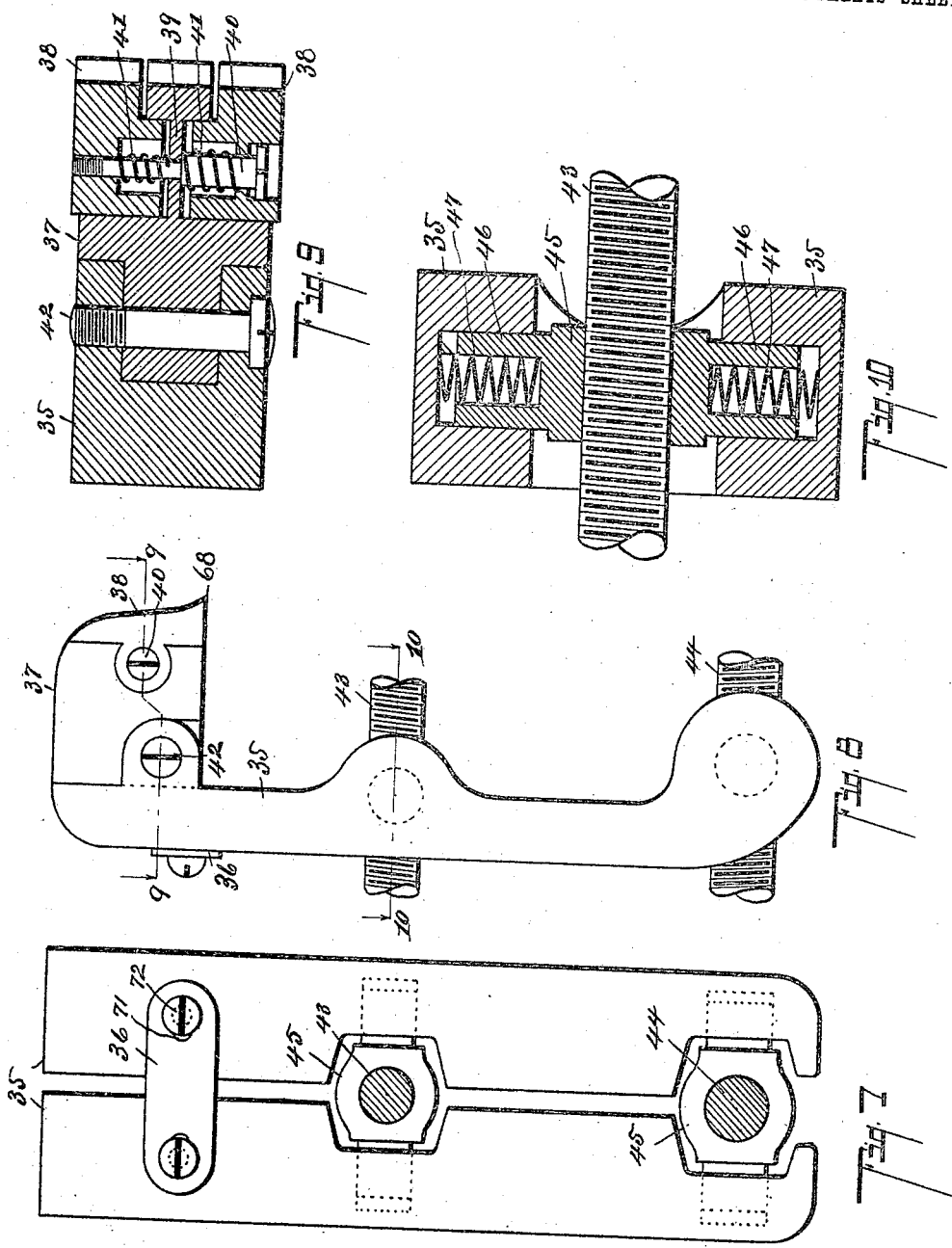

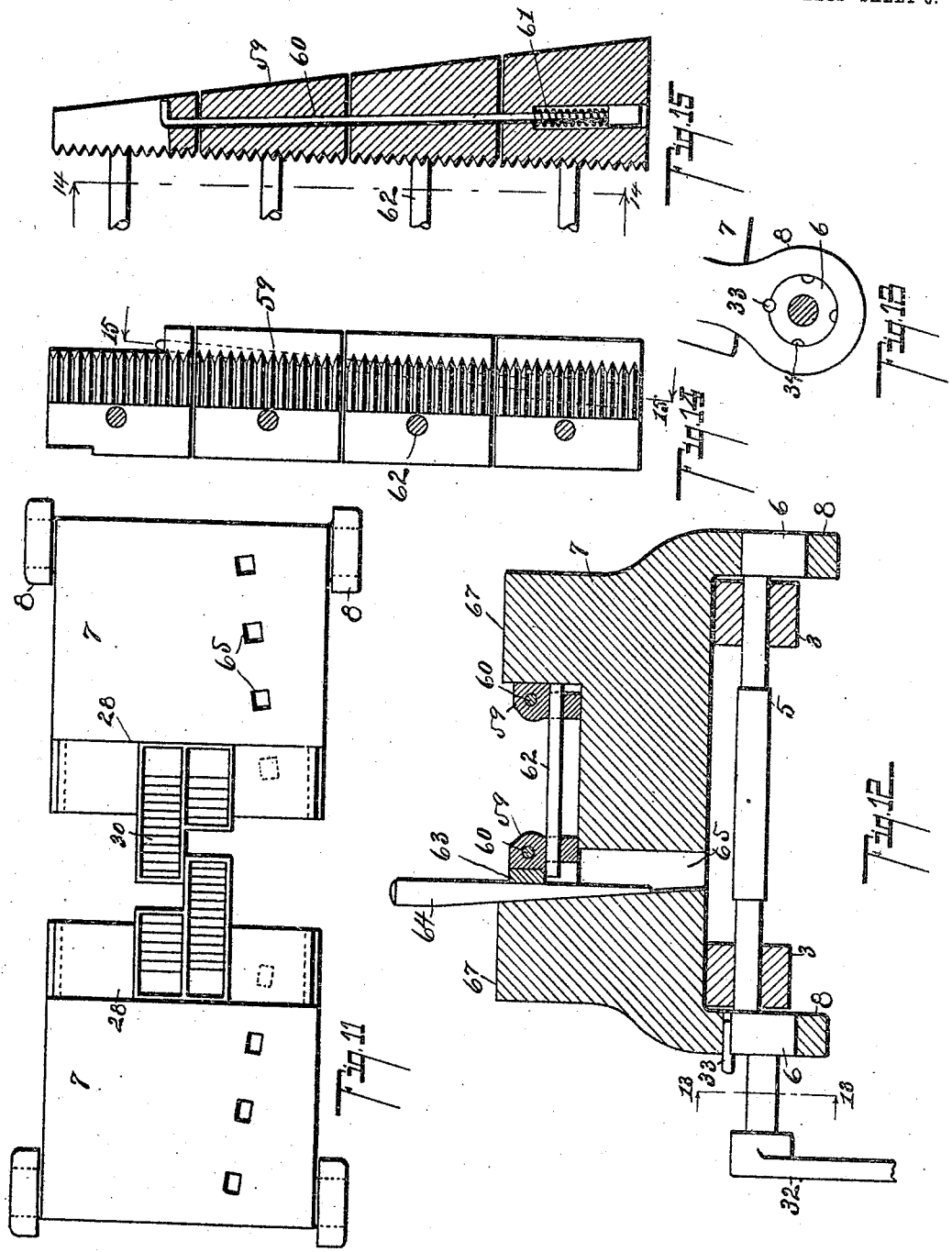

UNITED STATES PATENT OFFICE.

WILLIAM SCHAU, OF KALAMAZOO, MICHIGAN.

TIRE-SETTER.

948,637.  Specification of Letters Patent.  Patented Feb. 8, 1910.

Application filed October 15, 1906. Serial No. 339,088.

*To all whom it may concern:*

Be it known that I, WILLIAM SCHAU, a citizen of the United States, residing at the city of Kalamazoo, county of Kalamazoo, State of Michigan, have invented certain new and useful Improvements in Tire-Setters, of which the following is a specification.

This invention relates to improvements in tire-tighteners or tire-setters.

The objects of this invention are, first, to provide an improved tire-tightener or tire-setter adapted for use for tightening or setting tires on vehicle wheels of practically all sizes, that is, it may be used for setting very heavy tires or light ones, although it is especially designed for heavy work. Second, to provide an improved tire-tightener or setter by which the tires of vehicle wheels may be tightened or set without removing from the wheels and without injury to the felly or other parts of the wheel. Third, to provide an improved tire-tightener or tire-setter which is capable of very rapid manipulation and also one which is easily operated.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which, Figure 1, is a side elevation of my improved tire-tightener or tire-setter, a section of a wheel-rim or felly with tire thereon being shown in position to illustrate the relation and function of the parts. Fig. 2 is a vertical cross-section taken on a line corresponding to line 2—2 of Fig. 1. Fig. 3 is a horizontal section taken on a line corresponding to line 3—3 of Fig. 1. Fig. 4 is a vertical longitudinal section taken on a line corresponding to line 4—4 of Figs. 2 and 3. Fig. 5 is a vertical section taken on a line corresponding to line 5—5 of Fig. 4, showing the support for the shaft screw 17. Fig. 6 is a detail vertical section taken on a line corresponding to line 6—6 of Fig. 1, showing the locking means for the lever 53. Fig. 7 is a rear elevation of a pair of the clamps 35. Fig. 8 is a side elevation thereof. Fig. 9 is an enlarged section taken on a line corresponding to line 9—9 of Fig. 8, showing the details of the jaws of the clamps. Fig. 10 is an enlarged cross-section taken on a line corresponding to line 10—10 of Fig. 8. Fig. 11 is an inverted plan of the supporting plates 7 removed from the machine. Fig. 12 is an enlarged vertical section showing the details of these supporting plates and the details of the adjustable means therefor, taken on a line corresponding to line 12—12 of Fig. 4. Fig. 13 is a detail section taken on a line corresponding to line 13—13 of Fig. 12, showing further details of this adjusting means. Fig. 14 is an enlarged section taken on a line corresponding to line 14—14 of Fig. 15 of one of the tire-clamping or gripping jaws. Fig. 15 is a longitudinal section of one of these jaws taken on a line corresponding to line 15—15 of Fig. 14. Fig. 16 is an end elevation of one of the plates 7.

In the drawing the sectional views are taken looking in the direction of the little arrows at the ends of the section lines, and similar reference characters refer to similar parts throughout the several views.

Referring to the drawing, 1 is the standard portion of the frame of my improved tire-tightening or setting machine. On this standard is a curved bed 2 having bifurcated ends formed with projecting arms 3. These arms are longitudinally slotted as at 4, the slots preferably opening at the outer ends of the arms, as clearly appears in Fig. 4. A pair of tire supporting plates 7 are slidably arranged on the bed 2, these plates being oppositely arranged and adapted to be adjusted to and from each other, the plates being preferably curved to rest or bear upon the bed, as clearly appears in the drawing. The outer ends of the plates 7 are provided with downwardly projecting ears having holes therein, the ears preferably embracing the arms 3 of the bed 2, as clearly appears in Fig. 12. The rock shafts 5 are arranged in the slots 4 of the arms 3. These shafts are provided with eccentrics 6 which are arranged in the holes in the ears 8. It is apparent that by turning the shafts 5, the outer ends of the plates 7, through the eccentrics 6, are raised and lowered, the full purpose of which will more clearly appear as the description proceeds. Suitable cranks 32 are provided for adjusting the rock shafts 5. Locking pins 33 are provided for securing the rock shafts in their adjusted position, a plurality of notches 34 being provided in the periphery of the eccentrics 6, as clearly appears in Figs. 12 and 13. Levers 10, arranged in pairs, are mounted on the journals 9 projecting from the plates 7. The upper ends of the levers on each side are connected together by links 15. On each side of the standard 1 is a vertically adjustable bar 12, this bar being arranged longitudinally; see Figs. 1, 2 and 4. The bars 12 are provided with inwardly projecting studs 13 which engage the vertical slots 14 in the standard. Levers 11, arranged in pairs, are mounted on these bars 12 and are secured to the lower ends of the levers by the pivots or studs 16. The levers 11 are connected in pairs to the threaded nuts or blocks 18, the pivotal connection for the levers 10 and 11 being located between these blocks and the fulcrum points of the levers. The threaded blocks 18 are adapted to receive the screw shaft 17. The ends of this shaft are oppositely threaded, that is, one end is provided with a righthand and the other with a lefthand screw so that the levers 11 may be drawn together or forced apart according to the direction in whic hthe shaft is revolved. Longitudinal movement of the shaft 17 is prevented by the slotted plate 19 which is arranged to engage a suitable groove 70 in the shaft; see Figs. 4 and 5. The blocks 18 are journaled in the levers 11 so that they may rock to accommodate the change of position of the levers.

On the shaft 17 is a driving gear 20. Arranged to mesh with this gear is a pinion 23 driven by the crank 24, or by other suitable means. The crank shaft 22 for the pinion 23 is mounted in a suitable bearing carried by the bracket or standard 25. The link 21 is arranged to receive the screw shaft 17 and the crank shaft 22 and to hold the parts in proper relation.

The inner ends of the plates 7 are interlapped on their upper sides to form a continuous support for the tire at the point of upsetting the same. This is preferably accomplished by securing blocks 26 thereon, the form of the blocks appearing in Figs. 3 and 4. These blocks are loosely mounted being preferably secured by set screws 27, the holes in the block of the screws being large enough to accomplish this. The inner ends of the plates 7 are preferably supported on roller bearings. The bearing plates 28 are also preferably arranged to interlap so that the inner ends of the plates are continuously supported at the point of upsetting. The bearing plates 28 are preferably arranged as appears in Figs. 4 and 11, and are secured in position by set screws 29, the set screws being arranged through upwardly projecting arms on the plates. The blocks 26 rest on these arms so that they are firmly supported. The bearings for the rollers 30 are arranged in double series, as clearly appears in Fig. 11. The supporting plates 7 are loosely secured to the bearing plates 28 so that they may be adjusted somewhat independently thereof. The spring 31 is arranged between the plates 7 adapted to hold them normally apart. At each side of the plates 7 is a pair of clamps 35 adapted to engage the tire to clamp it down upon the support. Each clamp member is preferably provided with jaws 38 and 39, the central jaw 39 being fixed to or made integral with the jaw block, as clearly appears in Fig. 9. This is preferably accomplished by fitting the jaws into suitable seats provided therefor in the jaw block and securing them movably in these seats by screws 40 arranged therethrough. The jaws 38 are chambered out to receive the coiled springs 41 which are arranged upon the screw, the inner ends of the springs bearing against the fixed jaw 39, so that the jaws 38 are held normally outward or separated. The jaw blocks 37 are preferably secured to the clamping members 35 by suitable screws 42; see Figs. 8 and 9. The clamps 35 are arranged in pairs which are adjustably secured together. This is preferably accomplished by the links 36, having slots 71 therein through which the set screws 72 are arranged. The clamps 35 are carried by the screw shafts 43 and 44, these screws being oppositely threaded at each end so that the clamps are either drawn together or forced apart. These screws are arranged through suitable threaded blocks or nuts 45, which are journaled in the clamping members; see Figs. 7 and 10. The pairs of clamps are held normally separated by the springs 47 arranged in suitable chambers in the ends of the journals 46 of the nuts or blocks 45.

The screw shafts 43 and 44 are driven by the gears 48, which are arranged to mesh so that they are driven together. A suitable crank, as 49, is provided for one of the screws. Coiled springs are arranged on the shaft 44 for centering the link 58 thereon. The jaws of these clamping members are arranged to engage the felly on each side, the lower edge of the jaws having lips 68 for engaging the tire, as is illustrated in Fig. 2. After adjusting the clamps, they are forced downwardly to clamp the tire to the supporting plates by means of the lever 53. This lever is carried by the rock shaft 52, which is provided with a pair of arms 56 perforated at their outer ends. These arms are connected to the clamps 35 by a link 58, through the upper end of which the screw 44 is arranged. On the lower end of the link is a cross-piece 57 arranged through the holes in the outer ends of the arms 56; see Fig. 2. The link 58 is preferably curved to accommodate the screw shaft 17, and thereby secure a central pull on the clamps. When the lever 53 is forced downwardly this throws the clamps downwardly, thereby drawing the tire down against the supporting plates 7. Means are provided for locking the lever, preferably consisting of a rod 54, on which is a clutch plate 55 adapted to engage the lever, as is shown in Fig. 6. This clutch plate 55 forms a simple and effective means for the purpose, but it is evident that any suitable means might be provided for locking the lever.

The supporting plates 7 are provided with outwardly converging ribs 67, as clearly appears in Fig. 12. The tire clamping jaws 59 are arranged on the supporting plates and rest against these ribs; see Fig. 12. These jaws are wedge-shaped and are preferably made up of uniformly tapered sections secured together by rods 60 arranged longitudinally therethrough. This gives the sections a slight independent movement permitting them to adjust themselves to any irregularities of the tire. The sections are connected together in pairs by cross-rods 62. One set of jaws for each supporting plate is adjustable on these rods so that they may be locked and wedged up to accommodate tires of different widths.

In Fig. 12, I show a filler bar or block 63. Other blocks might be added, if desired. The ribs 67 are converged outwardly and the clamping jaws 59 are tapered or made wedge-shaped to correspond so that the tendency is for the jaws to draw tight or clamp on the tire as the plates 7 are moved inwardly.

The plates 7 are provided with a plurality of openings 65 therethrough to receive the wedge pins 64 by which the jaws may be forced up to grip the tire. The jaws 59 are held up in position to engage the tire and are also held normally inward by the springs 72. (See Figs. 4 and 16.) The gripping face of the jaws is preferably serrated, as clearly appears in Figs. 12, 14 and 15, the gripping portions being curved so that they firmly grip the tire but do not overlap and grip the felly.

My improved tire-tightening or tire-setting machine is preferably operated as follows: Presuming that the machine is open, that is, the clamping jaws, gripping jaws and the like, are open sufficiently to receive the tire on which it is desired to operate, the wheel is placed upon the supporting plates with the tire gripping jaws in position thereon, the wheel resting as illustrated in Fig. 4. The plates are set to conform to the curvature of the tire by means of the cranks 32, the connection having been previously described. By this means the machine may be adjusted to wheels of various diameters. The parts are locked in their adjusted position by means of the pins 33 as described. The clamps 35 are then adjusted by means of the crank 49 to bring the jaws of the clamps against the felly, the lips 68 resting upon the inside of the tire. The tire is then drawn firmly down upon the support therefor by means of the lever 53, through the connections already described, and locked in that position by means of the clutch plate 55. The tire clamping jaws 59 are then wedged into engagement with the tire by means of the wedge-pins 64, a sufficient number or sizes of blocking plates 63 being used to bring the jaws into proper relation to the tire. With the parts adjusted and clamped upon the tire, as stated, the plates 7 are drawn together by means of the power screw 17. On account of the gear, screw, and toggle connections for moving the plates described great power is secured so that comparatively little effort or power is required to upset a very heavy tire. Through the clamping means described, the tire is held so that the felly is not likely to be injured by this upsetting and the buckling of the tire is effectively prevented. A further advantage is that, on account of the arrangement and bearings for the parts, they are operated with comparatively little friction. Another advantage of the arrangement pointed out is that the machine is comparatively compact although capable of very heavy work. It is also capable of very rapid work. After the tire is upset the desired amount, it may be quickly released by releasing the lever 53 and backing off the clamps 35. The tire clamping jaws are then released by loosening the wedges 64. This frees the wheel so that it can be lifted from the machine. The other parts are then opened for the next operation.

I have illustrated and described my improved tire-tightening and setting machine in detail in the form preferred by me on account of the structural economy, strength and convenience in operation. I am, however, aware that it is capable of considerable variation in structural details without departing from my invention.

Having thus described my invention, what I claim as new and desire to secure by Letters Patent is:

1. The combination with a frame, having a bed, of a pair of tire supporting-plates mounted on said bed to be adjusted to and from each other; tire clamping jaws carried by said supporting-plates; a screw shaft having oppositely-threaded ends; levers arranged in coacting pairs mounted on said supporting-plates; links connecting the upper ends of said pairs of levers; threaded nuts or blocks on said screw shaft; vertically movable bars mounted on said frame; and levers mounted on said bars and connected to said blocks on said screw and to the said levers mounted on said supporting plates.

2. The combination with a frame, having a bed, of a pair of tire supporting-plates mounted on said bed to be adjusted to and from each other; tire clamping jaws carried by said supporting-plates; a screw shaft having oppositely-threaded ends; levers arranged in coacting pairs mounted on said supporting-plates; links connecting the upper ends of said pairs of levers; threaded nuts or blocks on said screw shaft; and connecting levers for said blocks to said levers mounted on said supporting plates, said connecting levers being provided with adjustably-supported bearings.

3. The combination with a frame, having a bed, of a pair of tire supporting-plates adjustably mounted on said bed; tire clamping jaws carried by said supporting-plates; a screw; levers actuated by said screw; levers connected to said tire supporting plates and to said levers actuated by said screw, said levers actuated by said screw being provided with compensating bearings.

4. In a tire setting machine, the combination with the tire clamps, of a pair of shafts for adjusting said clamps, said shafts having oppositely-threaded ends; threaded blocks or nuts for said shafts connected to said clamps; and means for drawing said clamps downwardly to clamp the tire, for the purpose specified.

5. The combination with a bed, of a pair of tire supporting plates mounted on said bed to be adjusted to and from each other; means for closing said plates together; clamps having jaws thereon arranged in slidably connected pairs, each clamp being provided with a central fixed jaw and a laterally yielding jaw at each side thereof; and means for drawing said clamps downwardly to clamp the tire upon said supporting plates, as specified.

6. The combination with a bed, of a pair of tire supporting plates mounted on said bed to be adjusted to and from each other; means for closing said plates together; clamps having jaws thereon adapted to engage the sides of a felly, said jaws having lips on their lower edges adapted to engage the inner side of a tire; a pair of shafts for adjusting said clamps, said shafts having oppositely threaded ends; threaded blocks or nuts on said shafts connected to said clamps; means for drawing said clamps downwardly to clamp the tire upon the supporting plates; and tire clamping jaws carried by said supporting plates, for the purpose specified.

7. The combination with a bed, of a pair of tire supporting plates mounted on said bed to be adjusted to and from each other; means for closing said plates together; clamps having jaws thereon adapted to engage the sides of a felly arranged in slidably connected pairs, each clamp being provided with a central fixed jaw and a laterally yielding jaw at each side thereof, said jaws having lips on their lower edges adapted to engage the inner side of a tire; and means for drawing said clamps downwardly to clamp the tire upon said supporting plates, as specified.

8. The combination with a bed, of a pair of tire supporting plates mounted on said bed to be adjusted to and from each other, the inner ends of said plates being interlapped to break the joint between them; interlapping bearing plates for said supporting plates; bearing rollers therefor arranged in double series; means for adjusting said plates to bring them into proper relation to the tire to be operated upon; means for closing said plates together; and tire clamping jaws carried by said plates, for the purpose specified.

9. The combination with a bed, of a pair of tire supporting plates mounted on said bed to be adjusted to and from each other; rock shafts having eccentrics thereon arranged to engage the outer ends of said supporting plates whereby they are adjusted to bring them into proper relation to the tire to be operated upon; means for locking said shafts in their adjusted position; means for closing said plates together; and tire clamping jaws carried by said plates, for the purpose specified.

10. The combination with a bed, of a pair of tire supporting plates mounted on said bed to be adjusted to and from each other; interlapping bearing plates for said supporting plates; bearing rollers therefor arranged in double series; means for closing said plates together; and tire clamping jaws carried by said supporting plates, for the purpose specified.

11. The combination with a bed, of a pair of tire supporting plates mounted on said bed to be adjusted to and from each other, said plates having upwardly projecting ribs thereon; means for closing said plates; wedge-shaped tire clamping jaws arranged on said supporting plates within said ribs thereof, said clamping jaws being made up of sections of uniform taper connected by rods arranged longitudinally therethrough; springs arranged on said rods for holding said plates in position on said rods; cross rods on which said jaw sections are arranged; and wedge pins for clamping said jaws upon the edge of a tire.

12. The combination with a bed, of a pair of tire supporting plates mounted on said bed to be adjusted to and from each other, said plates having upwardly projecting ribs thereon; means for closing said plates; wedge-shaped tire clamping jaws arranged on said supporting plates within said ribs thereof, said clamping jaws being made up of sections of uniform taper connected by rods arranged longitudinally therethrough; cross rods on which said jaw sections are arranged; and wedge pins for clasping said jaws upon the edges of a tire.

13. The combination with a bed, of a pair of tire supporting plates mounted on said bed to be adjusted to and from each other; means for closing said plates; wedge-shaped tire clamping jaws arranged on said supporting plates, said clamping jaws being made up of sections of uniform taper connected by rods arranged longitudinally therethrough; springs arranged on said rods for holding said plates in position on said rods; and means for clamping said jaws upon the edges of a tire.

14. The combination with a bed, of a pair of tire supporting plates mounted on said bed to be adjusted to and from each other; means for closing said plates; wedge-shaped tire clamping jaws arranged on said supporting plates, said clamping jaws being made up of pivotally connected sections of uniform taper; and means for clamping said jaws upon the edges of a tire.

15. The combination with a bed, of a pair of tire-supporting plates mounted on said bed to be adjusted to and from each other; clamping jaws arranged on said supporting plates; and springs arranged to hold said clamping jaws normally inward and their outer ends upward.

16. The combination with a bed, of a pair of tire-supporting plates mounted on said bed to be adjusted to and from each other; clamping jaws arranged on said supporting plates; and springs arranged to hold said clamping jaws normally inward.

17. The combination with a bed, of a pair of tire-supporting plates mounted on said bed to be adjusted to and from each other; clamping jaws arranged on said supporting plates; and springs arranged to hold said clamping jaws normally upward.

18. The combination with a bed, of a pair of tire supporting plates mounted on said bed to be adjusted to and from each other; means for closing said plates together; clamps having jaws thereon adapted to engage the sides of a felly, arranged in slidably connected pairs, each clamp being provided with a central fixed jaw and a laterally yielding jaw at each side thereof, said jaws having lips on their lower edges adapted to engage the inner side of a tire; means for adjusting said clamps; and tire-clamping jaws carried by said supporting plates, the inner ends of which are arranged to engage the outer jaws of said clamps, whereby said jaws are closed by the closing movement of said supporting plates, for the purpose specified.

19. The combination with a bed, of a pair of tire supporting plates mounted on said bed to be adjusted to and from each other; means for closing said plates together; clamps having jaws thereon adapted to engage the sides of a felly, arranged in slidably connected pairs, each clamp being provided with a central fixed jaw and a laterally yielding jaw at each side thereof, said jaws having lips on their lower edges adapted to engage the inner side of a tire; means for adjusting said clamps; and tire-clamping jaws carried by said supporting plates, for the purpose specified.

20. The combination with a bed, of a pair of tire supporting plates mounted on said bed to be adjusted to and from each other; means for closing said plates together; clamps having laterally yielding jaws adapted to engage the inner side of a tire; means for adjusting said clamps; and tire clamping jaws carried by said supporting plates, the inner ends of which are arranged to engage the outer jaws of said clamps whereby said jaws are closed by the closing movement of said supporting plates, for the purpose specified.

21. The combination with a bed, of a pair of tire supporting plates mounted on said bed to be adjusted to and from each other; means for closing said plates together; clamps having laterally yielding jaws adapted to engage the inner side of a tire; means for adjusting said clamps; and tire clamping jaws carried by said supporting plates, for the purpose specified.

22. The combination with a bed, of a pair of tire supporting plates mounted on said bed to be adjusted to and from each other; interlapping blocks loosely mounted on the inner ends of said plates; means for adjusting the outer ends of said plates; bearing plates on which the inner ends of said tire supporting plates are loosely mounted, said bearing plates being adapted to support the interlapping blocks of said tire supporting plates; and means for closing said plates together for the upsetting of a tire.

23. The combination with a bed, of a pair of tire supporting plates adjustably mounted thereon; tire gripping jaws carried by said plates; rock shafts; eccentrics carried by said rock shafts adapted to engage said tire supporting plates whereby they may be adjusted to the tire; and means for closing said tire supporting plates.

24. In a structure of the class described, the combination with a pair of tire supporting plates having upwardly-projecting outwardly-converging ribs thereon; wedge-shaped tire gripping jaws arranged in coacting pairs on said plates between said converging ribs thereof; connecting rods for said jaws, at least one of the jaws of each pair being slidably mounted on said rods; and means for closing said plates together for upsetting a tire.

25. In a structure of the class described, the combination of tire supporting plates having upwardly-projecting outwardly-converging ribs thereon; tire gripping jaws arranged in coacting pairs between the said ribs; connecting rods for said pairs of jaws; and a spring arranged to hold the outer ends of said jaws normally upward.

In witness whereof, I have hereunto set my hand and seal in the presence of two witnesses.

WILLIAM SCHAU. [L. S.]

Witnesses:
LULU G. GREENFIELD,
OTIS A. EARL.